P. CLERGET.
ENGINE AND LIKE CONNECTING ROD HEAD.
APPLICATION FILED OCT. 30, 1916.

1,261,769.

Patented Apr. 9, 1918.

Inventor:
Pierre Clerget
per H. W. Plucker
Attorney.

UNITED STATES PATENT OFFICE.

PIERRE CLERGET, OF LEVALLOIS, FRANCE, ASSIGNOR TO SOCIETE CLERGET, BLIN & CIE., OF LEVALLOIS, SEINE, FRANCE.

ENGINE AND LIKE CONNECTING-ROD HEAD.

1,261,769.  Specification of Letters Patent.  Patented Apr. 9, 1918.

Application filed October 30, 1916. Serial No. 128,467.

*To all whom it may concern:*

Be it known that I, PIERRE CLERGET, a citizen of the Republic of France, residing at 37 Rue Cavé, Levallois, Seine, in the Republic of France, have invented certain new and useful Improvements in Engines and like Connecting-Rod Heads, of which the following is a specification.

The present invention relates to a construction or arrangement of connecting rod heads for motors having inclined or radially arranged cylinders.

The arrangement is characterized by the fact that the arc of support of the connecting rod head on the crank pin of the crank shaft is made as large as possible by the use, for each connecting rod, of crossed superposed helicoidal guides the ends of which engage, respectively and symmetrically, with relation to the axis of the connecting rod, in special circular grooves which carry the connecting rod and eliminate play.

By means of the construction or arrangement of guides, hereinafter described, the ends of the guides are distributed in pairs on either side of the connecting rod, so that this latter is guided around the axis of the crank pin under conditions which are such that it cannot suffer any rotary movement about its axis such as is liable to be produced in the similar systems known at the present time.

In this arrangement, the connecting rods are all similar to each other, are equal in dimensions and of the same weight. Furthermore the corresponding bearing parts of the assemblage have the same radii as each other.

A constructional form of this arrangement of mounting connecting rods is shown by way of example in the accompanying drawing.

Figure 1:
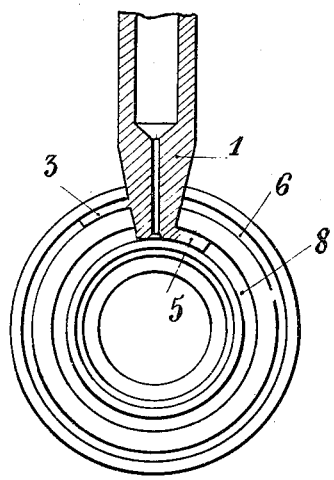
Figure 1 is a transverse vertical section showing a single connecting rod mounted in one of the connecting rod carriers.
Figure 2:
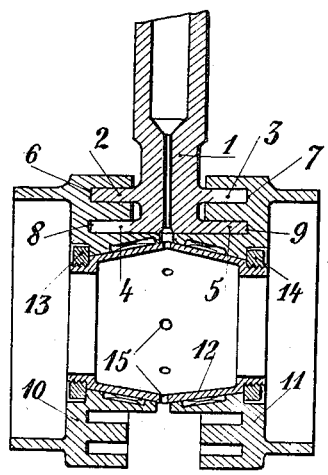
Fig. 2 is a longitudinal section through the axis of the crank shaft bearing.
Figure 3:
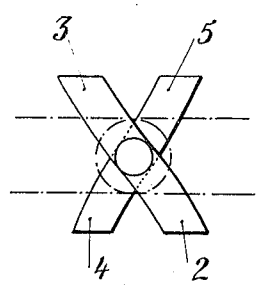
Fig. 3 is a plan of the guides.
Figure 4:
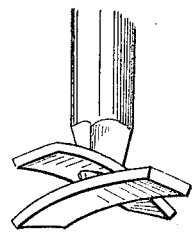
Fig. 4 shows an example of a connecting rod in which the guides are inclined in the opposite direction to that of the guides shown in Fig. 3.

The heads of the connecting rods 1 are of a section tapering toward the center of the crank pin, which allows of their being mounted in one and the same plane by arranging them radially about the center with the amount of play necessary to permit of relative movement.

According to the essential characteristic of the invention each connecting rod carries lateral projections or guides 2, 3, 4, 5 arranged symmetrically in pairs on each side of the said connecting rod. These guides form part of portions of crossed helices drawn upon cylinders of different diameters, the pitch of one being left handed and the pitch of the other right handed.

Each pair of guides 2, 3 or 4, 5 of one and the same helix fits into the concentric circular grooves 6, 7 or 8, 9 made in the crosshead carriers 10, 11 mounted upon the crank pin and embracing the guides of all the connecting rods.

It follows from this arrangement that the alternate right and left handed guides are superposed and crossed like an X following the helices of different pitch.

All the internal and external faces of the guides bear symmetrically on their supports at each stage of the movement and the whole of the two pairs of guides crossed X-wise thus furnishes a double symmetrical support for each connecting rod.

The two connecting rod carriers 10, 11 are alike and are assembled by means of a double conically tapered socket member 12; they are secured in place by nuts 13, 14 screwed on to the ends of the socket 12 and seated in circular recesses in the said cross head carriers.

Lubrication is effected through holes 15 provided along the common plane of the base of the two cones of the socket 12 and through the gap left between the two connecting rod carriers.

The connecting rods thus arranged are alike, and are the same distance from the center and are capable of moving with the same latitude as if each of them possessed only a single pair of guides arranged on the ends of one and the same helicoidal guide.

The arrangements above described are given by way of example only; the forms, dimensions, constructional details and applications thereof may vary without departing from the essential characteristics of the invention.

Figure 5:
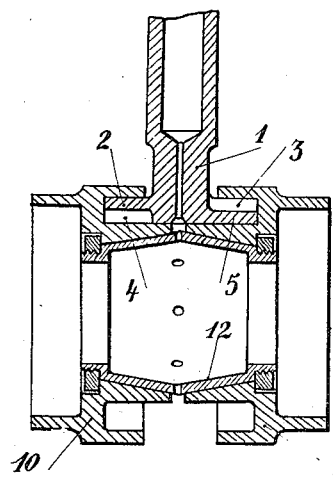
Fig. 5 is a longitudinal section of a modified construction.

In Fig. 5 it will be seen that the support is reduced by half by doing away with the metal ring comprised between two of the concentric grooves of one and the same connecting rod carrier, so that only a single groove is left in each connecting rod carrier. In this case, the guides are immediately superposed without any interval other than that necessary for the play of the corresponding guides of the adjacent connecting rods. It is therefore the interior faces of the interior guides which receive the forces of compression, and the external faces of the external guides which effect the pull.

For great strains, the number of guides in each groove may be doubled, concentrically for example and in supplementary grooves, which allows of a greater number of connecting rods being mounted around one and the same crank pin, sufficient bearing surface being provided for each of them.

The direction of inclination of the guides is immaterial, the essential point being that all the connecting rods of one and the same crank pin be alike.

What I claim and desire to secure by Letters Patent of the United States is:—

1. Connecting-rod heads for motors having inclined or radial cylinders, each of which is provided with helical crossing superposed projecting guides, and means for supporting and connecting the guides to a crank pin on which the connecting rods are journaled.

2. Connecting-rod heads for motors having inclined or radial cylinders each of which is provided with crossing superposed helical projecting guides, connecting-rod-carrying plates provided with circular slots in which the projections of the guides engage, and means for assembling and mounting the plates on a crank pin on which the connecting rods are journaled.

3. Connecting-rod heads for motors having inclined or radial cylinders each of which is provided with crossing superposed helical projecting guides, connecting-rod-carrying plates provided with circular slots, in which the projecting guides engage, and a device having the form of a double truncated cone for the purpose of assembling and mounting these plates on a crank pin on which the connecting rods are journaled.

4. Connecting-rod heads for motors having inclined or radial cylinders each of which is provided with crossing superposed helical projecting guides, two plates arranged on each side of the big ends of the connecting rods and provided with circular slots for the purpose of supporting the guides and a socket member in the form of a double truncated cone mounted on a crank pin on which the connecting rods are journaled and on which the two plates are mounted.

5. Connecting-rod heads for motors having inclined or radial cylinders each of which is provided with crossing superposed helical guides, two plates arranged on each side of the big ends of the connecting-rods and provided with circular slots for the purpose of supporting the guides, a double conical socket member mounted on a crank pin on which the connecting-rods are journaled and on which are mounted the two plates and devices for maintaining the said plates in position on the double conical socket member.

In testimony whereof I affix my signature in presence of two witnesses.

PIERRE CLERGET.

Witnesses:
 CHAS. P. PRESSLY,
 VICTOR DUPONT.